Sept. 29, 1970

W. C. NUSZ 3,530,729

FRICTION GEARING DRIVE MEANS FOR A WIRE WINDING POWER
TAKOFF ATTACHMENT
Filed Feb. 26, 1969

Woodrow C. Nusz
INVENTOR.

BY Clarence A. O'Brien
and Harvey B. Jacobson
Attorneys

United States Patent Office 3,530,729
Patented Sept. 29, 1970

3,530,729
FRICTION GEARING DRIVE MEANS FOR A WIRE
WINDING POWER TAKEOFF ATTACHMENT
Woodrow C. Nusz, R.F.D., Okeene, Okla. 73763
Filed Feb. 26, 1969, Ser. No. 802,374
Int. Cl. F16h *37/00, 15/08*
U.S. Cl. 74—15.4                                        10 Claims

ABSTRACT OF THE DISCLOSURE

First and second rotatable shafts with a friction disk mounted on the first shaft for rotation therewith and a friction wheel mounted on the second shaft for rotation therewith and shifting axially therealong. The second shaft is mounted for angular displacement relative to the first shaft to swing the wheel thereon generally axially of the first shaft whereby to selectively frictionally engage the periphery of the wheel with an axial end face of the disk and shifting of the wheel axially of its shaft serving to shift the area of contact of the wheel with the disk generally along a diameter of the disk.

---

The wire winding attachment of the instant invention is designed for use in conjunction with a farm tractor or other similar equipment and includes a support frame which is adapted to be supported from the hitch of the associated tractor. A first drive shaft is journaled from the frame for rotation about a fixed axis and is adapted to be driven from the power take-off of the associated tractor. A drive disk is mounted on the first shaft for rotation therewith and a second driven shaft is journaled from the frame and includes one end portion thereof which is coupled to the other end portion thereof by means of a universal joint. The other end portion of the driven shaft is journaled for rotation about a fixed axis and the articulated end portion of the shaft is swingable in a path generally paralleling the axis of rotation of the first shaft and has a friction wheel mounted thereon for rotation therewith and shifting axially therealong. Suitable means is provided whereby the articulated end of the second shaft may be swung toward one axial end face of the drive disk so as to frictionally engage the driven wheel with the drive disk and the means by which the articulated end portion is movable toward and away from the drive disk is also operative to shift the friction wheel along the articulated end portion of the second shaft in a path generally paralleling a diameter of the drive disk. By this arrangement, the driven shaft may be driven in either direction and at various speeds during constant rotation of the first drive shaft at a constant speed.

The attachment of the instant invention is particularly well adapted for use as a wire winding apparatus and the ability of the attachment to cause rotation of its driven shaft in either direction and at various speeds while the power output shaft of the associated tractor is turning at a constant speed enables the operator of the attachment to precisely control the speed at which a section of wire is being wound, or unwound if desired.

The main object of this invention is to provide a wire winding attachment for a tractor power take-off and which may be readily supported from the lift assembly of the tractor.

A further object of this invention, in accordance with the immediately preceding object, is to provide a wire winding attachment including a novel speed and direction control whereby wire may be wound on or unwound from the attachment at substantially any speed independent of a variance in the speed of operation of the driving tractor power take-off.

Another important object of this invention is to provide a wire winding attachment including a single control whereby the direction and speed of winding of the driven shaft of the attachment may be readily controlled by a single control.

A final object of this invention to be specifically enumerated herein is to provide a wire winding attachment in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
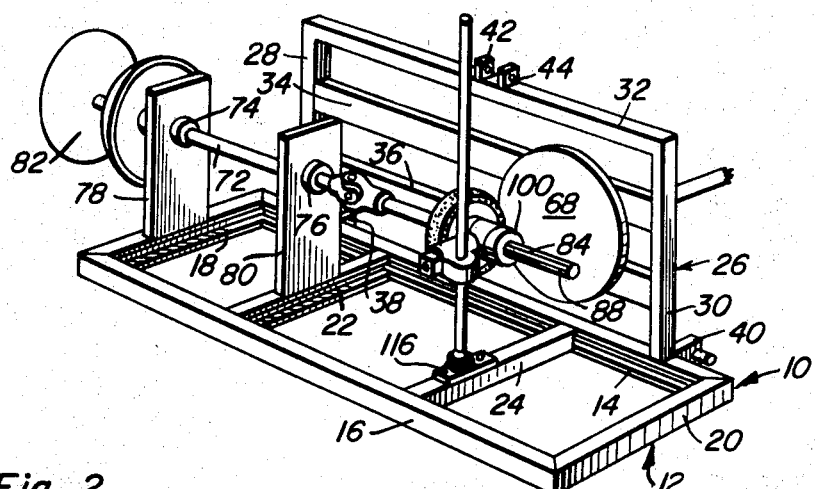
FIG. 1 is a perspective view of the wire winding attachment.
Figure 2:
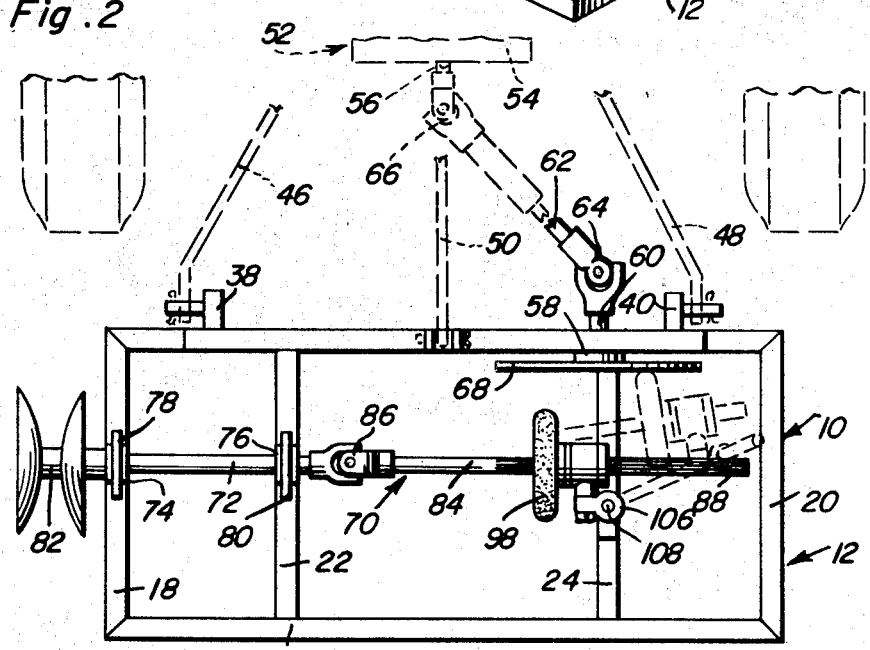
FIG. 2 is a top plan view of the wire winding attachment in operative association with the rear portion of a conventional form of tractor, the tractor being illustrated in phantom lines.
Figure 3:
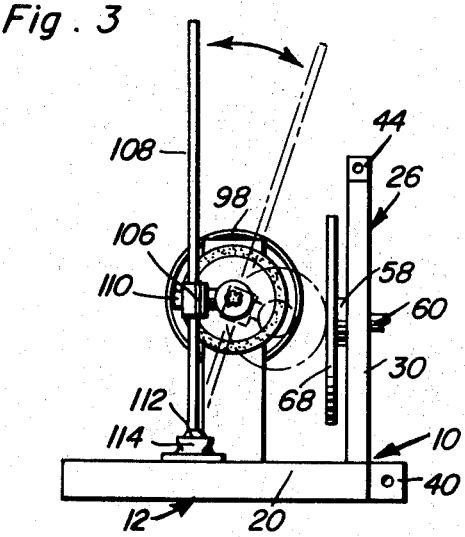
FIG. 3 is an end elevational view of the attachment as seen from the right side of FIG. 2.
Figure 4:
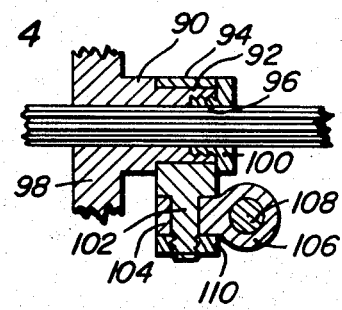
FIG. 4 is an enlarged fragmentary horizontal sectional view illustrating the manner in which the control for the wire winding attachment is operatively connected to the friction wheel portion of the attachment.

Referring now more specifically to the drawings, the numeral 10 generally designates the attachment of the instant invention which may be seen to include a main frame referred to in general by the reference numeral 12 provided with front and rear longitudinal members 14 and 16 interconnected by means of opposite end transverse members 18 and 20 as well as intermediate transverse members 22 and 24.

The frame 12 includes an upstanding forward portion referred to in general by the reference numeral 26 and the forward portion 26 may be seen to include opposite end upstanding members 28 and 30 whose lower ends are secured to the forward longitudinal member 14, at corresponding opposite ends thereof, and whose upper ends are interconnected by means of an upper horizontal member 32. In addition, a pair of intermediate horizontal members 34 and 36 are vertically spaced from each other and between the upper horizontal member 32 and the forward longitudinal member 14 and are secured between the opposite end upstanding members 28 and 30.

The frame 12 includes a pair of lower forwardly projecting mounting lugs 38 and 40 as well as a pair of apertured mounting ears 42 and 44 projecting upwardly from and spaced along the upper horizontal member 32. The lugs 38 and 40 as well as the ears 42 and 44 are adapted to have the rear ends of the three arms 46, 48 and 50 secured thereto. The arms 46, 48 and 50 comprise the hitch arms of a conventional form of tractor referred to in general by the reference numeral 52.

The tractor 52 includes a power take-off 54 including an output shaft 56 and a journal member 58 is supported between the intermediate brace members 34 and 36 and rotatably receives a drive shaft 60 therethrough. The forward end of the drive shaft 60 is operatively connected to the rear end of a diagonal shaft 62 by means of a universal joint 64 and the forward end of the diagonal shaft 62 is operatively coupled to the rear end of the output shaft 56 by means of a universal joint 66. The drive shaft 60 has a drive disk 68 mounted on its rear end and a second shaft referred to in general by the reference numeral 70 includes a first end portion 72 journaled from journal members 74 and 76 supported from uprights 78 and 80, respectively, projecting upwardly from the transverse members 18 and 22. The free end of the driven shaft 70 which projects through the journal member 74 is provided with a winding drum 82 and the shaft 70 includes a second end portion 84 which is drivingly coupled to the first end portion 72 by means of a universal joint 86. The end of the section 84 of the shaft 70 remote from the universal joint 76 is splined as at 88 and has the hub portion 90 of a friction wheel 98 mounted thereon for rotation therewith and shifting longitudinally of the section 84. The hub portion 90 includes a diametrically reduced portion 92 upon which a sleeve 94 is mounted and the free end of the hub portion 92 is provided with a threaded counterbore 96 in which a threaded retainer 100 is threadedly secured so as to retain the sleeve portion 94 on the diametrically reduced portion 92. The sleeve portion 94 includes a generally radially outwardly projecting mounting shank portion 102 upon which the sleeve portion 104 of a fixture 106 rotatable relative to a control rod 108 is mounted. The sleeve portion 104 of the slide 106 is retained on the mounting shank portion 102 by means of a threaded fastener 110 and the control rod 108 is disposed upright with the fixture 106 intermediate its opposite ends. The lower end of the control rod 108 includes a partial spherical enlargement 112 which is captively retained in a socket member 114 secured to the transverse member 24 by means of suitable fasteners 116.

In operation, the frame 12 is supported from the arms 44, 48 and 50 and the power take-off 54 may be actuated to cause the output shaft 56, and thus the shaft 60, to rotate. Of course, rotation of the shaft 60 will cause rotation of the disk 68. After the power take-off 54 has been actuated, should it be desired to rotate the shaft 70, the upper end of the control rod 108 is grasped by the operator of the attachment 10 and urged forwardly so as to shift the friction wheel 98 into contact with the rear axial end face of the drive disk 68. The direction of rotation of the shaft 70 will be determined by which side of the axis of rotation of the disk 68 the friction wheel 98 is caused to contact. If it is desired to rotate the shaft 70 at maximum speed for a given rotational speed of the output shaft 56, the control rod 108 is shifted longitudinally of the frame 12 so as to position the friction wheel 98 adjacent one of the peripheral portions of the disk 68. On the other hand, if it is desired to rotate the shaft 70 at a slow speed in relation to the speed of rotation of the output shaft 56, the control rod 108 has its upper end swung longitudinally of the frame to a position with the medial plane of the friction wheel 98 only slightly spaced from the axis of rotation of the shaft 60 when the friction wheel 98 is shifted into contact with the disk 68. Of course, the shaft 72 may be utilized to wind wire on the winding drum 82 or to unwind wire from the winding drum 82.

While it is possible to have the slide rotatable relative to the control rod 108, the slide 106 may have a reasonably tight frictional fit with the control rod 108 whereby the free end of the shaft section 84 will be retained in elevated position. If it is desired, any suitable abutment may be secured to the shaft or control rod 108 beneath the slide 106 so as to enable the latter to freely rotate on the control rod 108 but prevent it from sliding downwardly along the control rod 108.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A variable speed drive unit including a pair of shafts, a first of said shafts being journaled for rotation about a fixed axis and the second of said shafts including a shaft section having one end portion shiftable laterally toward and away from one end of said first shaft, one of said shafts having a friction disk assembly mounted thereon and the other of said shafts having a friction wheel assembly mounted thereon, said assemblies being mounted on their respective shafts for rotation therewith and the assembly mounted on said shaft section being also shiftable along the latter, said friction wheel assembly being adapted for rolling frictional engagement with one axial end face portion of said disk assembly at various points along a diameter of said disk assembly upon shifting of said shaft section toward said one end of said first shaft and sliding movement of the assembly on said shaft section along the latter.

2. The combination of claim 1 wherein said friction wheel assembly is mounted on said shaft section.

3. The combination of claim 1 wherein the second shaft includes a second shaft section journaled for rotation about an axis stationarily positioned relative to the first mentioned axis, the other end portion of the first mentioned shaft section being generally aligned with said second shaft section and coupled to the adjacent end thereof by means of a coupling member allowing at least slight angular displacement of the first shaft section during rotation of said shaft section.

4. The combination of claim 3 wherein said coupling member comprises a universal joint.

5. The combination of claim 1 wherein the assembly mounted on said shaft section includes a concentric spindle portion, a sleeve rotatably receiving said spindle portion therethrough and supported therefrom against excessive axial shifting relative to said spindle portion, a support shaft, means universally supporting one end of said support shaft, said sleeve being supported from said shaft for swinging therewith.

6. The combination of claim 5 wherein said friction wheel assembly is mounted on said shaft section.

7. The combination of claim 5 wherein the second shaft includes a second shaft section journaled for rotation about an axis stationarily positioned relative to the first mentioned axis, the other end portion of the first mentioned shaft section being generally aligned with said second shaft section and coupled to the adjacent end thereof by means of a coupling member allowing at least slight angular displacement of the first shaft section during rotation of said shaft sections.

8. The combination of claim 1 wherein said shafts are journaled from a frame adapted to be supported from the lift arms of a tractor hitch, one of said shafts being adapted to be driven from the power take-off of a tractor, the other of said shafts having a winding member mounted thereon for rotation therewith.

9. The combination of claim 1 wherein the assembly mounted on said shaft section includes a concentric spindle portion, a sleeve rotatably receiving said spindle portion therethrough and supported therefrom against excessive axial shifting relative to said spindle portion, a support shaft, means universally supporting one end of said support shaft, said sleeve being supported from said shaft for swinging therewith, said shafts being generally horizontally disposed and positioned generally at right angles to each other, said support shaft being disposed generally upright and said one end of said support shaft comprising the lower end thereof.

10. The combination of claim 9 wherein said shafts are journaled from a frame adapted to be supported from the lift arms of a tractor hitch, one of said shafts being adapted to be driven from the power take-off of a tractor, the other of said shafts having a winding member mounted thereon for rotation therewith, said lower end of said support shaft being universally supported from said frame.

References Cited
UNITED STATES PATENTS

| | | | |
|---|---|---|---|
| 1,191,858 | 7/1916 | Waite | 74—194 |
| 1,213,636 | 1/1917 | Heckard | 74—194 |
| 1,219,552 | 3/1917 | Harrier | 74—194 |

LEONARD H. GERIN, Primary Examiner

U.S. Cl. X.R.

74—197